United States Patent [19]
Thomson

[11] 3,825,745
[45] July 23, 1974

[54] OBJECT DETECTING SYSTEM

[75] Inventor: E. Craig Thomson, Wellesley, Mass.

[73] Assignee: Electronics Corporation of America, Cambridge, Mass.

[22] Filed: May 21, 1973

[21] Appl. No.: 362,113

[52] U.S. Cl............. 250/208, 250/221, 340/258 B
[51] Int. Cl...................... G06m 7/00, G08b 13/00
[58] Field of Search......... 250/208, 221; 340/258 B

[56] References Cited
UNITED STATES PATENTS
3,746,863   7/1973   Pronovost.......................... 250/208

*Primary Examiner*—James W. Lawrence
*Assistant Examiner*—T. N. Grigsby

[57] ABSTRACT

An object detecting system in which an area is monitored by a series of sequentially operated sensor channels which form a step-wise moving beam to trace out a curtain of radiation across the area, each channel including a radiation transmitter and a corresponding radiation sensor. The transmitter of each channel is permitted to receive an energizing pulse only if an output has been produced by the preceding channel; a pulse from a sensor is permitted to produce a channel output only if the transmitter of the preceding channel has received an energizing pulse. The system may be locked out if the radiation path between the transmitter and sensor of a channel is blocked by an object during operation of the channel.

24 Claims, 3 Drawing Figures

3,825,745

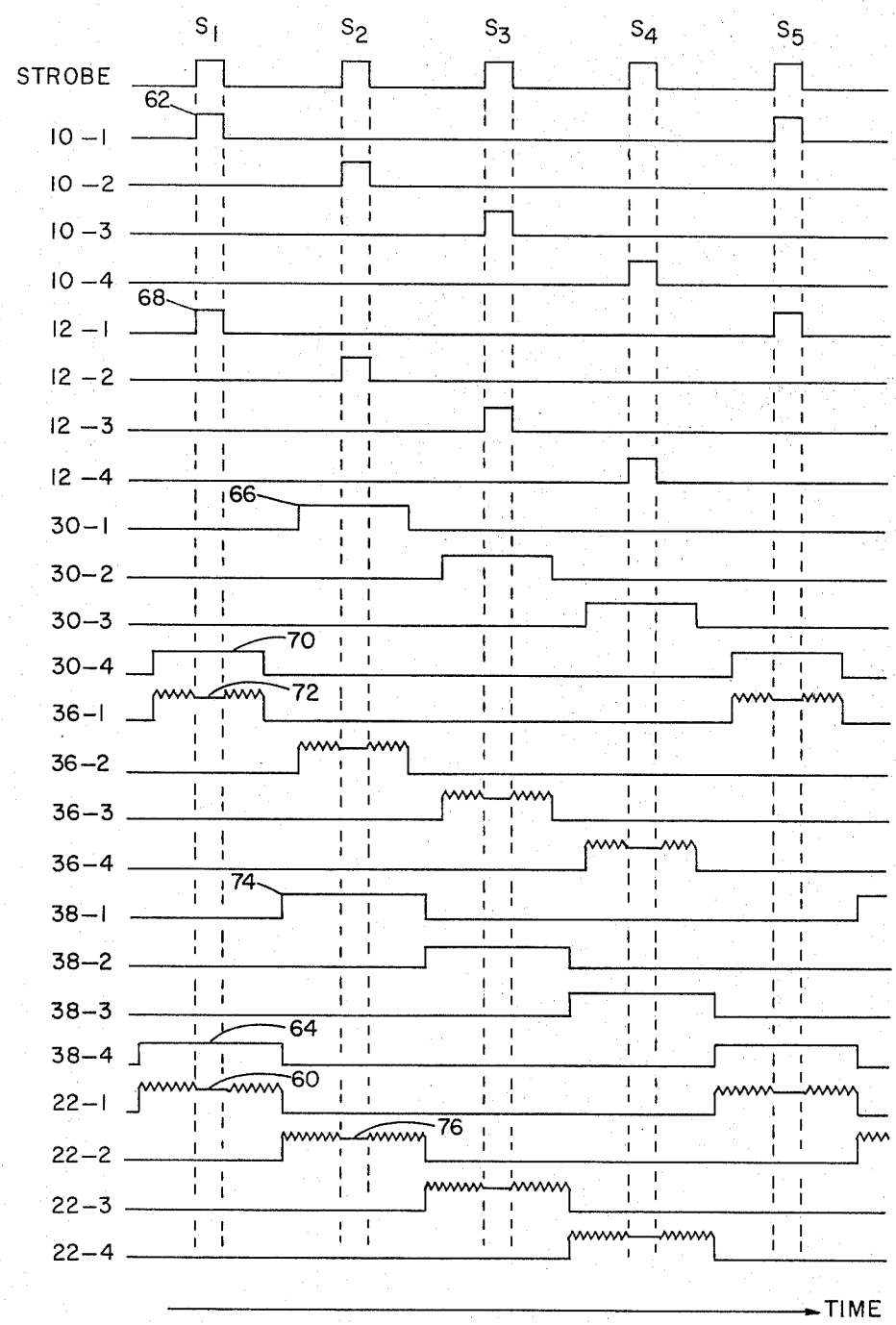

OBJECT DETECTING SYSTEM

This invention pertains to photoelectric sensing systems, and more particularly to curtain of light type systems for determining whether an object is within a predetermined monitored area.

Curtain of light type systems have been developed in which several light sources project parallel light beams across a monitored area to corresponding light sensors on the other side of the area. A control operation is initiated if light to one or more sensors is interrupted by an object penetrating into the area. While conventional light curtain systems have proven to be useful detection devices, the resolution attainable by the systems is limited by the manner in which light beams are transmitted and sensed. In order to achieve the resolution necessary to detect small objects, a large number of closely spaced, small diameter beams must be used. This in turn leads to the problem of precisely aligning the transmitters and sensors such that any one sensor is unresponsive to light from a beam immediately adjacent to it, while it is entirely responsive to a beam from its transmitter mate. The beams must be highly collimated or each sensor given a very narrow field of view, or both, to ensure that an object interrupting only one or a few beams is detected. The degree of precision required makes a highly accurate curtain of light system of the type described impractical except in monitoring relatively narrow areas.

It is an object of the present invention to provide a novel and improved object detecting system of the light curtain type in which neither highly collimated light beams nor light sensors with restricted fields of view are required, yet which is sensitive to objects covering only a small portion of a monitored area. Another object is the provision of a novel and improved object detecting system having a plurality of detection channels in which only a predetermined number of channels are operated at a time to preclude spurious indications resulting from cross-channel signals. It is a further object to provide such an object detection system in which the detection channels are operated sequentially to attain full coverage of a monitored area, limited only with respect to the spacing between channels. A more particular object is the provision of a novel and improved control system for an object detecting system of the light curtain type in which each of a plurality of detection channels are provided with input and output controls, the input control for a given channel adapted to permit the transmission of a light beam in that channel only in response to an output signal from the preceding channel, and the output control for a given channel adapted to permit a channel output signal only in response to operation of the input control for the preceding channel, thereby inhibiting sequential operation of all detection channels when an object is detected by any of the channels.

In the accomplishment of the above-mentioned objects the present invention provides an object detecting system having a series of detection channels, each channel including a radiation transmitter and a radiation sensor. Means are provided for energizing the radiation transmission means of each channel, and channel operation is controlled by means that enable the operation of a channel only in response to the operation of the preceding channel in a closed loop sequence.

The invention contemplates as an energizing means a source of energizing pulses connected to an input control at the input to each channel. Sensor pulses produced by the sensors in response to received radiation are delivered to an output control for each channel and produce a channel output if permitted by the output control. The channel input controls are conditioned in response to an output signal from the preceding channel to pass an energizing pulse to their associated transmitters, while the channel output controls are conditioned in response to an operation of the input control for the preceding channel to permit a channel output to be produced by a sensor pulse. Should an object block a channel radiation path, the corresponding sensor will fail to operate and no channel output will be produced. Consequently the next detection channel is not conditioned to transmit radiation during subsequent energizing pulses, and neither the input nor output controls of succeeding channels are conditioned thereafter. Means are provided for removing conditioning signals from both input and output controls after an energizing pulse, to prevent unintended channel operations.

In a particular embodiment of the invention both the input and the output controls comprise AND gates with appropriate inputs thereto to perform the desired control functions. The aforementioned conditioning states are applied from one channel to the next by means of delay circuits, and the embodiment includes means for removing conditioning signals from a channel after the channel has had an opportunity to operate under a pulse from a source of regular, short duration, high energy pulses such as a strobe. The delay circuit between the input control for one channel and the output control for the next channel may be a one-shot multivibrator, while the delay circuit between the output control for one channel and the input control for the next channel may include a delayed output flip-flop with a feedback path between the flip-flop and the said input control. The transmitters are preferably light emitting diodes.

A starting circuit provides conditioning signals to one or more channels, conditioning the channels to operate during a subsequent strobe pulse and thereby initiating self-sustained sequential channel operation. In a preferred embodiment the starting circuit gates a strobe pulse to selected input and output delay circuits, thereby assuring a synchronous monitoring start when the next strobe pulse is applied. The gate is preferably a flip-flop circuit that gates a first strobe pulse and is reset by the next strobe pulse.

Another feature of the invention involves apparatus for indicating that an object is within the monitored area and blocking the radiation path for a channel. According to this feature a relay is connected to one or more channels and set to operate an indicating signal or the like when the relay is de-energized by failure of the channels to operate in conjunction with the strobe. In a preferred embodiment all the channel outputs are connected to a relay and provide a substantially continuous relay energizing signal when the detecting system is operating without interruptions. When an object is detected, operation of the detecting channel is prevented and the system locks out, de-energizing the relay.

Additional features and advantages of the invention will be seen from the following detailed description of a particular embodiment thereof, in conjunction with drawings in which:

FIG. 3 is a timing diagram showing the operation of various circuit elements.

DESCRIPTION OF PARTICULAR EMBODIMENT

Figure 1:
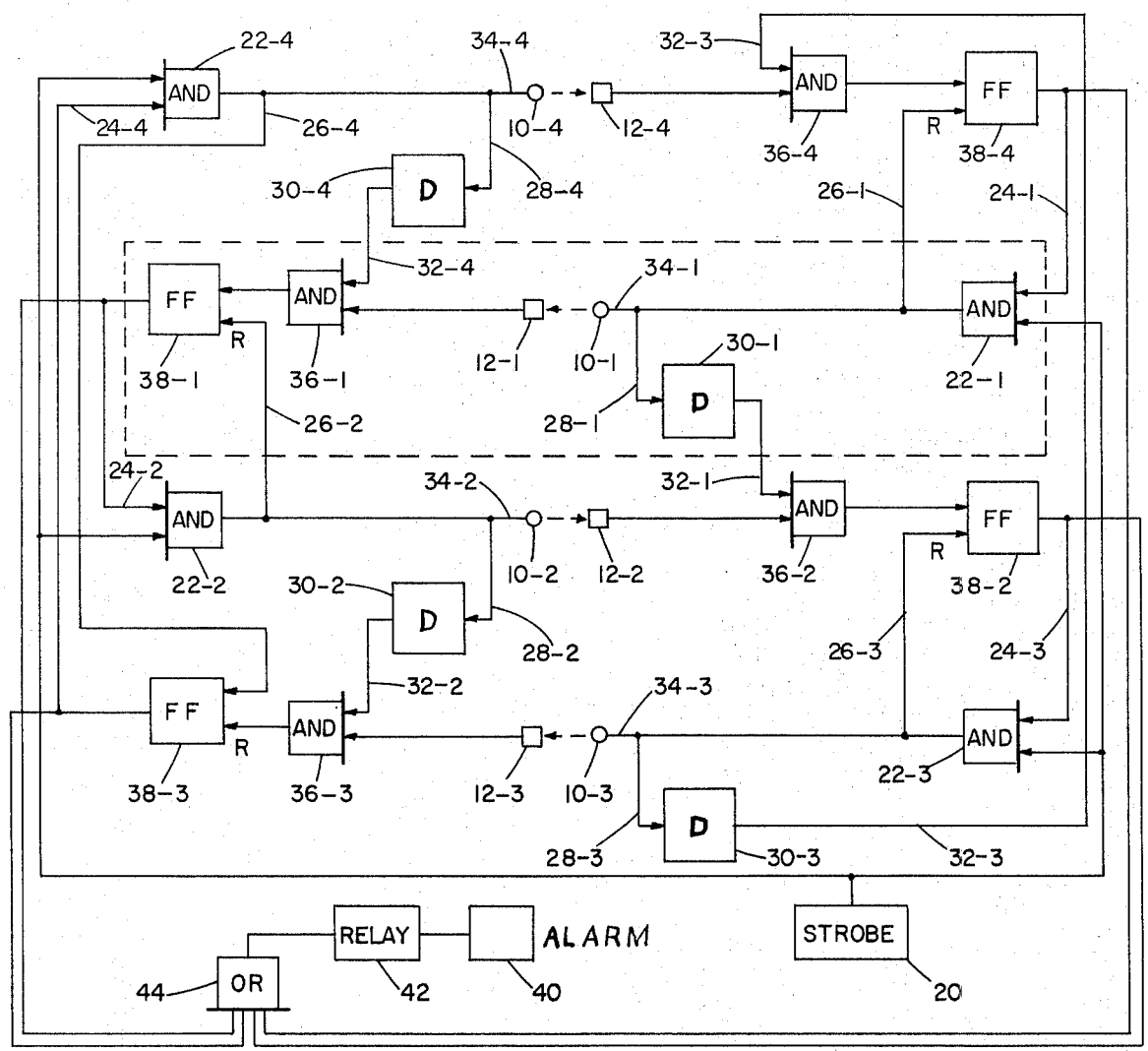
FIG. 1 is a block diagram of circuitry in accordance with the invention.

As illustrated in FIG. 1, the system includes a plurality of light transmitters 10, indicated at 10-1 – 10-4, and a corresponding number of sensors 12, indicated at 12-1 – 12-4. These transmitters and sensors are disposed in two spaced arrays on opposite sides of the area to be monitored. The transmitters and sensors are also arranged in pairs with the members of each pair positioned directly opposite one another in the arrays to form a plurality of detection channels. The transmitters and sensors of each successive pair are alternated in the arrangement shown in FIG. 1, but it will be understood that all the sensors may be on one side of the area 14 being supervised and the transmitters on the other side, or other arrangements of transmitters and sensors may be utilized. The transmitters 10 are preferably light emitting diodes (LED) which are particularly well adapted for this application as they produce a considerable amount of light energy in the form of pulses that are of short duration compared to the repetition rate. Such light emitting diodes may be standard devices with built-in diverging beam forming lenses. The sensors 12 may be lensed photodiodes or phototransistors, for example, and have a rapid response.

The circuitry is repetitive for each transmitter-sensor pair and may be described with reference to a single channel, shown enclosed in dashed lines in FIG. 1. A source 20 of regular, short duration, high energy pulses such as a strobe is connected to input control AND circuit 22-1. A second input to AND circuit 22-1 extends over line 24-1 from the preceding channel, which includes transmitter 10-4 and sensor 12-4. The output of the AND circuit 22-1 is connected by line 26-1 back to the preceding channel, by line 28-1 to delay circuit 30-1 and thence by line 32-1 to the next channel, and by line 34-1 to transmitter 10-1. Sensor 12-1 is connected to output control AND circuit 36-1, a second input to which comes from delay 30-4 associated with the preceding channel. The output of AND circuit 36-1 is connected to set flip-flop 38-1, the set output of which is applied over line 24-2 to AND circuit 22-2 of the following channel.

The delay circuit 30 for each of the channels may be a one-shot multivibrator which is triggered by a strobe pulse passed by the input control AND circuit 22 for the channel during one strobe pulse and which produces an output pulse to condition the output control AND circuit 36 of the next channel shortly before the next strobe pulse. For example, the output of the one-shot 30-4 provides a gate for passing a signal generated by sensor 12-1. When sensor 12-1 has an output during the gated interval, flip-flop 38-1 is set and, after a delay interval, an output signal is applied on line 24-2 to condition input control AND circuit 22-2 of the next channel. When a strobe signal is passed by conditioned gate 22-2, the resulting output on line 26-2 resets the flip-flop 38-1, removing the conditioning signal from AND gate 22-2. The gated strobe signal in addition energizes light emitting diode 10-2 and is also passed on line 28-2 to trigger delay circuit 30-2 and establish an output gate during the next strobe cycle for the next channel. While more than one sensor 12 may respond to the output of any energized transmitter 10, only one output control AND circuit 36 is conditioned during any one strobe pulse. If an AND circuit 36 produces an output, it sets its associated flip-flop 38 to condition the input AND circuit 22 of the next channel. The output of flip-flop 38 may be delayed, if necessary, to prevent a signal on line 26-2 during the next strobe pulse from resetting the flip-flop 38 and prematurely disenabling the next AND circuit 22 while the strobe pulse is still being applied.

The delay circuits shown and described herein are for purposes of illustration; other circuits for conditioning a channel in response to an operation of the preceding channel may be envisioned. For example, one-shots may be used at the channel outputs and flip-flops at the channel inputs, although the embodiment of FIG. 1 is particularly useful with respect to an alarm system described below.

It is another feature of the invention to provide an appropriate alarm 40 or other means such as a shutdown switch which is operated in response to an object moving into a channel transmission path and blocking light from a transmitter 10 from reaching its paired sensor 12. The alarm 40 is controlled by a relay 42 and is turned on when the relay is de-energized. The relay can be controlled by the outputs from any number of channels in a "keep alive" circuit to hold the relay energized. In a particular embodiment each of the channel outputs from delayed flip-flops 38 are connected to the input of OR gate 44, the output of which energizes the relay coil whenever a signal is present at the OR gate 44 input. The operation of flip-flops 38 is delayed by an amount such that the flip-flop for one channel is set to produce a channel output and the flip-flop for the preceding channel is reset to remove an output signal from the preceding channel at substantially the same time. A signal is therefore present at the input to OR gate 44 at all times to hold the relay in unless an object is detected. When detection occurs further channel operation is prevented and the relay is de-energized, turning on the alarm.

Figure 2:
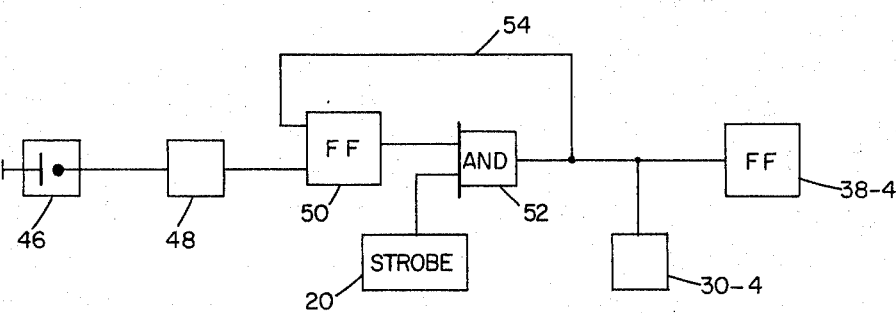
FIG. 2 is a block diagram of a starting circuit.

Operation of the detection system is initiated by a starting circuit shown in FIG. 2. Switch 46 when depressed triggers one-shot multivibrator 48 to deliver a pulse which sets flip-flop 50, the set output of which conditions AND circuit 52 to pass the next pulse from strobe 20, the strobe also being connected to the input of AND circuit 52. The output of the AND circuit 52 is connected to condition the input and output controls for a given channel and thereby initiate sequential channel operation upon application of the next strobe pulse by setting the flip-flop 38 and triggering the one-shot 30 for the preceding channel. In FIG. 2 for example, flip-flop 38-4 is set and one-shot 30-4 is triggered by the starting circuit, conditioning the following channel (enclosed in dashed lines in FIG. 1) to transmit a light beam and produce a channel output during the next strobe pulse. A synchronous start is assured because the strobe itself is used to condition the channel. A feedback path 54 from the output of AND circuit 52 resets flip-flop 50 to prevent a second starting pulse from entering the object detecting system. The feedback path 54 may include a delay if necessary to maintain an output from AND circuit 52 long enough to condition the detection channel. The starting circuit is readily adaptable to initiate a multiple sequencing of light beams if desired by connecting the output of AND circuit 52 to condition additional channels simultaneously with the first channel. The additional channels should be spatially separated by an amount sufficient to ensure that no sensor element 12 can be energized by light transmitted in another simultaneously operated channel.

A further understanding of the operation of the system may be had with reference to the timing diagram in FIG. 3. The starting circuit causes the input and output control AND circuits 22-1 and 36-1 of the first channel to be conditioned, a conditioned state during which a second signal is not present at an AND gate being indicated by a zig-zag line in FIG. 3. In response to a strobe pulse $S_1$, conditioned AND circuit 22-1 passes pulse 60 to energize transmitter LED 10-1, as indicated by pulse 62. Pulse 60 also resets flip-flop 38-4, the delayed output of which is shown as pulse 64, to remove the conditioning level from AND gate 22-1 after pulse $S_1$ has terminated. Pulse 60 in addition is applied to delayed one shot circuit 30-1 as a triggering input to produce output pulse 66 on line 32-1. Sensor 12-1 produces output pulse 68 in response to received light from transmitter 10-1, which pulse is passed through AND circuit 36-1, conditioned by output 70 from the delayed one shot circuit 30-4 of the preceding channel. The resulting pulse 72 at the output of AND circuit 36-1 is applied to set flip-flop 38-1. After a delay output pulse 74 is produced by flip-flop 38-1 and conditions AND circuit 22-2 of the next channel to pass strobe pulse $S_2$ and initiate a similar operation for the second channel. The conditioning level is removed from the output of flip-flop 38-1 by output pulse 76 from AND circuit 22-2, resetting the flip-flop and preventing the second channel from operating during subsequent strobe pulses until it is again conditioned.

Should an object such as a hand or finger in a dangerous monitored area of an operating machine block one of the light beams sequencing through the array, the conditioned sensor 12 for that channel will not produce an output and its flip-flop 38 will remain reset. As no output on line 24 to the next channel input control 22 is produced, the next channel will not be conditioned to transmit a light beam during the next strobe pulse and accordingly no channel output will be produced. As a result no subsequent channels can be conditioned and the circuit is effectively latched. The entire light curtain may thus be locked out when only one of the light beams is interrupted. When the light curtain is locked out a desired control function can be initiated, such as sounding an alarm or turning off a monitored machine, by means of a relay or the like as described above.

While a preferred embodiment of the invention has been shown and described, there are modifications thereof which will be apparent to those skilled in the art, and therefore it is not intended that the invention be limited to the disclosed embodiments or to the details thereof, and departures may be made therefrom within the spirit and scope of the invention as defined in the claims.

What is claimed is:

1. An object detecting system for monitoring an area comprising
a source of energizing pulses,
a series of sequentially operated detection channels, each said detection channel including a radiation transmitter on one side of the monitored area and a radiation sensor on the other side of the area adapted to produce a signal when the transmitter is operated, a channel input control in communication with said pulse source and conditioned in response to an output signal from the preceding channel, and a channel output control conditioned in response to operation of the input control for the preceding channel, said input control, when conditioned, passing an energizing pulse to operate its transmitter, and said output control, when conditioned, passing a signal from its associated sensor to produce a channel output signal for conditioning of the input control of the next channel during the next pulse cycle,
means for removing a conditioning signal from a channel input control after passage of a pulse from said source, and
means for removing a conditioning signal from a channel output control after passage of a signal from its associated sensor.

2. A system according to claim 1 wherein said detection channels are arranged for discrete operation in spatial sequence, and the placement of the transmitter and sensor for successive channels is alternated across the sides of the monitored area.

3. A system according to claim 1 wherein each said channel includes a delay circuit responsive to operation of its input control during an energizing pulse, said circuit connected to provide a conditioning signal to the output control of the next channel during the next energizing pulse.

4. A system according to claim 3 including means for removing said conditioning signal after the next energizing pulse.

5. A system according to claim 4 wherein said delay circuit comprises a delayed one-shot multivibrator.

6. A system according to claim 1 wherein each said channel includes a delay circuit responsive to operation of its output control, said circuit connected to provide a channel output conditioning signal to the input control of the next channel during the next energizing pulse.

7. A system according to claim 6 including means for removing said conditioning signal after the next energizing pulse.

8. A system according to claim 7 wherein said removing means includes a feedback path between the delay circuit for each channel and the input control for the next channel.

9. A system according to claim 8 wherein said delay circuit comprises a flip-flop circuit having a delayed output.

10. A system according to claim 1 including means for indicating the presence of an object in the monitored area, and further including means responsive to the absence of an output from any of said channels for operating said indicating means.

11. A system according to claim 1 wherein said channel input control comprises an AND gate, having as inputs a signal from said pulse source and an output signal from the preceding channel.

12. A system according to claim 1 wherein said channel output control comprises an AND gate, having as inputs an output signal from the radiation sensor element for the channel and the signal produced in response to operation of the input control of the preceding channel.

13. A system according to claim 1 wherein said transmitters are light emitting diodes.

14. A system according to claim 1 including a starting circuit adapted to provide conditioning signals to the input control and output control for one or more channels.

15. A system according to claim 14 wherein said starting circuit includes means for gating an energizing pulse to provide said conditioning signals.

16. An object detecting system for monitoring an area comprising
 a plurality of detection channels spanning the monitored area, each channel including spaced radiation transmission means and radiation sensor means,
 means for energizing the radiation transmission means of each channel, and means enabling sequential operation of said channels in a closed loop sequence including
 means enabling operation of a channel only in response to the operation of the preceding channel and means responsive to operation of each channel to disable operation of the preceding channel so that only one channel is fully operative at any one time.

17. A system according to claim 16, including a start-up circuit to enable operation of at least one channel for a start-up period, thereby initiating operation of the channels in said sequence.

18. A system according to claim 16, including means responsive to a failure of said channels to operate for operating an alarm.

19. An object detecting system for monitoring an area comprising
 a plurality of detection channels spanning the monitored area, each channel including spaced radiation transmission means and radiation sensor means located on opposite sides of the monitored area,
 means for energizing the radiation transmission means of each channel, and
 means enabling operation of a channel only in response to the operation of the preceding channel in a closed loop sequence, said means enabling channel operation including an input control and an output control associated with each channel, each input control conditioned in response to an output signal from the preceding channel to pass an energizing signal from said energizing means to the transmission means of its associated channel, each output control conditioned in response to operation of the input control for the preceding channel to pass a signal from the sensor means of its associated channel for conditioning of the input control of the next channel.

20. A system according to claim 19, further including means for removing a conditioning signal from a channel input control after passage of an energizing signal, and means for removing a conditioning signal from a channel output control after passage of a signal from its associated sensor.

21. A system according to claim 19, wherein each said channel includes a delay circuit responsive to operation of the output control for the channel, said delay circuit connected to provide a delayed conditioning signal to the input control of the next channel.

22. A system according to claim 21, wherein each said channel includes a delay circuit responsive to operation of the input control for the channel, said delay circuit connected to provide a delayed conditioning signal to the output control of the next channel.

23. A system according to claim 22, including means for removing said delayed conditioning signals from the channel input and output control after a predetermined period of time.

24. An object detecting system for monitoring an area comprising:
 a plurality of detection channels spanning the monitored area, each channel including spaced radiation transmission means and radiation sensor means, means enabling sequential operation of said channels including means enabling operation of a channel only in response to the operation of the preceding channel and means responsive to operation of each channel to disable operation of the preceding channel.

* * * * *